April 16, 1968 B. LETELLIER 3,378,849

DIRECTION-FINDING ELECTROMAGNETIC WAVE RECEIVERS USING MULTIPLE BEAM ANTENNAS

Filed March 7, 1967 4 Sheets-Sheet 1

April 16, 1968 B. LETELLIER 3,378,849

DIRECTION-FINDING ELECTROMAGNETIC WAVE RECEIVERS USING MULTIPLE BEAM ANTENNAS

Filed March 7, 1967 4 Sheets-Sheet 2

United States Patent Office 3,378,849

Patented Apr. 16, 1968

3,378,849

DIRECTION-FINDING ELECTROMAGNETIC WAVE RECEIVERS USING MULTIPLE BEAM ANTENNAS

Bernard Letellier, Paris, France, assignor to CSF—Compagnie General de Telegraphie Sans Fil, a corporation of France Filed Mar. 7, 1967, Ser. No. 621,340
Claims priority, application France, Mar. 10, 1966, 52,942, Patent 1,477,715
4 Claims. (Cl. 343—113)

ABSTRACT OF THE DISCLOSURE

Monopulse receiver (or radar) has sum and difference outputs sequentially switched through common amplifier. Sum channel is used for automatic gain and frequency control. Comparison of sum and difference channels yields angle data for indicator or tracking in azimuth and/or elevation. Receiver may be switched between search and track modes.

The present invention relates to electromagnetic wave receivers equipped with multiple beam antennas for direction-finding purposes. Receivers of this kind are used, in particular, for the tracking of taregts. The determination of the angular direction is made with the aid of "sum" and "difference" signals derived from the signals respectively picked up by different antenna beams.

In receivers of this kind, generally one sum channel is used and one or two separate difference channels. It is essential that the overall complex gains in these channels should be strictly identical throughout the whole of the input level range of the received signals.

It has been proposed that a single I.F. amplifier with automatic gain control should be used, for both the signals of the sum and difference channels by using multiplexing techniques.

In the case of pulse signals, it has been suggested that time-division multiplexing should be effected by means of delay lines with different delay characteristics, coupled to I.F. amplifiers. For lack of delay lines having the requisite characteristics, this solution has not found practical application. Frequency-divison multiplexing has been used in a number of instances. This system, which has the advantage that the standardization of the signals can be effected by a limited amplifier instead of an automatic gain control, is however unsatisfactory due to the difficulties encountered in the design of the single side band modulator and of filters whose respective centre frequencies differ from one another.

It is an object of this invention to apply time multiplexing by sampling to receivers of the above mentioned type.

According to the invention, there is provided a multiple beam electromagnetic receiver including means for simultaneously receiving a plurality of signls and means for deriving therefrom an intermediate frequency sum signal and at least one intermediate frequency difference signal, comprising: means for alternately sampling said sum and difference signals; a variable gain amplifying circuit having a signal input, a cotrol input and an output; means for feeding all said sampled signals to said input; switching means having an input coupled to said amplifier output and a plurality of outputs respectively corresponding to said sum and difference signals; means for controlling said switching means in synchronism with said gating means; and means for coupling said output corresponding to said sum signal to said control input.

For a better understanding of the invention and to show how the same may be carried into effect, reference will be made to the drawings accompanying the following description and in which.

Figure 1:
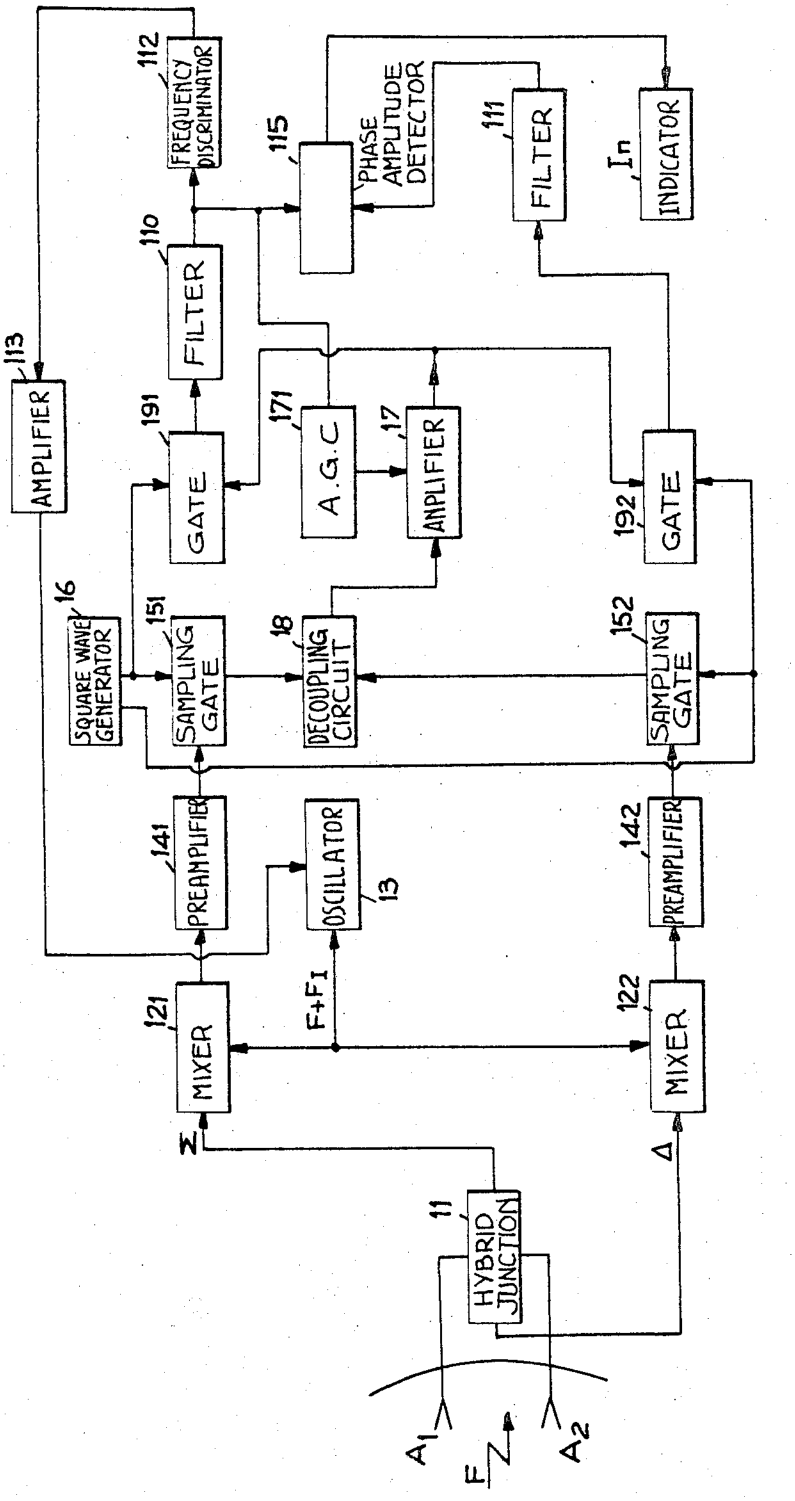
FIG. 1 illustrates the block diagram of a receiver according to the invention.

In FIG. 1, there is shown an antenna with two sources $A_1$ and $A_2$, for a double beam receiver.

The aerial system used for supplying the two signals, from which the sum and difference signals are derived, is quite conventional. It may be, for example, of the type used in monopulse radar systems.

It will be assumed that the receiver receives a continuous wave of frequency F. Later in the description, it will be shown how the receiver in accordance with the invention can be used in pulse-modulated radar systems.

The signals furnished by the two beams are combined in a circuit 11, for example a hybrid junction, which respectively produces at its outputs Σ and Δ the sum and difference of the signals picked up by the two beams.

These signals are frequency translated to the intermediate frequency $F_I$ in the mixers 121 and 122 respectively, which also receive a local signal of frequency $F+F_I$ from a frequency-cotrolled oscillator 13. The intermediate frequency sum and difference signals are amplified in the respective preamplifiers 141 and 142, whose constant gain figures are strictly identical. These selective preamplifiers are designed to filter the useful signals. The outputs of the preamplifiers are designed to filter the useful signals. The outputs of the preamplifiers are respectively coupled to the signal inputs of sampling gates 151 and 152 which alternately open with a frequency $F_R$. To this end, the control inputs of the gates are connected, for example, to the two opposite-phase outputs of a square wave generator 16, for instance a continuously operated astable multivibrator.

The outputs of the gates 151 and 152 are connected by means of a decoupling circuit 18, for example, in the form of an adder to the input of a variable gain wideband amplifier 17. The output of the amplifier 17 is coupled to the signal inputs of gates 191 and 192. These gates are alternately opened at the same time as the gates 151 and 152 respectively. To this end, their control inputs are respectively coupled to the control inputs of the gates 151 and 152. In this way, at the outputs of the gates 191 and 192 respectively, there are obtained the signals of channels Σ and Δ, which have been sampled at 151 and 152. and amplified at 17. In practice, to allow for the transit time through the amplifier, the time of opening of the gates 191 and 192 will be reduced so that they become conductive slightly later than the associated sampling gate.

The discrete signals, appearing at the outputs of the gates 191 and 192, are applied to filters 110 and 111, which respectively produce a continuous sum wave and a continuous difference wave. One of these waves, for example the sum wave, is applied in known fashion to a frequency discriminator, 112, the output signal of which, after amplification in the amplifier 113, controls the frequency of the oscillator 13. It is also applied to the automatic gain control circuit 171 of the amplifier 17.

The sum wave and the difference wave are finally compared in a phase-amplitude detector or comparator, 115, which produces the required angle data, for example on an indicator $I_n$.

Of course, this indication can be used in different ways; thus, in tracking receivers, to which the invention is particularly applicable, this indication, which appears in the form of a bipolar voltage proportional to the tracking error, is applied after amplification to a servomotor which drives the aerial in a sense which tends to cancel out the voltage, i.e. to maintain the axis of the aerial in the direction of the target.

Figure 2:
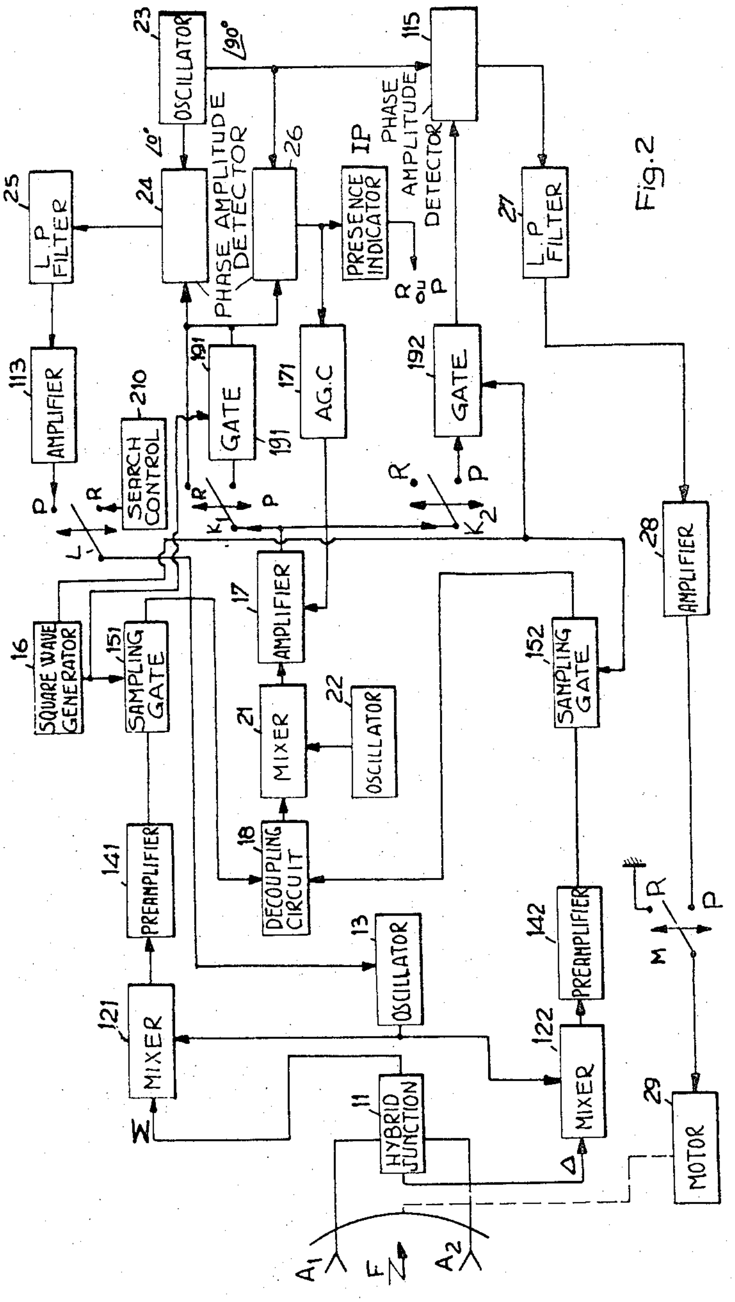
FIG. 2 illustrates an example of a tracking receiver according to the invention.

The circuit diagram of a receiver in accordance with the invention, more particularly usable for tracking purposes, is illustrated in FIG. 2 where references identical to those used in FIG. 1 designate the same elements.

The receiver illustrated is of the double superheterodyne type, in particular for avoiding interference between the local oscillator and the frequency tracking loop.

To this end, the output signals from the gates 151 and 152 undergo at the output of the decoupling circuit a second frequency conversion in a mixer 21 which is supplied with a signal at a frequency $F_I+F_{I'}$ from a stabilised local oscillator 22.

For comparing between them the sum and difference signals, the reference signal from a stable local oscillator is employed and preferably the frequency control of the oscillator 13 will be effected through the medium of a phase loop.

To this end, a stable local oscillator 23 operating at the frequency $F_{I'}$, produces at two outputs $\angle 0°$ and $\angle 90°$, two waves which are in quadrature. The output $\angle 0°$ and the output of the gate 191 are connected to the two inputs of a phase-amplitude detector 24.

The output signals from the latter, after passage through a low-pass filter 25 and amplification in the amplifier 113, are applied to the control input of the oscillator 13. A further phase-amplitude detector 26, connected on the one hand to the output of the gate 91 and on the other to the output $\angle 90°$ of the oscillator 23, supplies both the signal indicating the presence of a target to the circuit IP and the gain control signal to the circuit 171.

The phase-amplitude detector 115, which furnishes the angle signal, i.e. the tracking signal, receives on the one hand the output signal from the gate 192 and, on the other, the $\angle 90°$ signal from the oscillator 23, which wave is amplitude and phase controlled by the sum signal, as explained hereinbefore. The advantage of this circuit over that one in which the sum and difference signals are directly compared with one another, is that the noise signal components are eliminated and that, moreover, the intermediate frequency filters 110 and 111 of FIG. 1 can be be dispensed with, since there is a permanent signal at one of the inputs of each detector 24, 26 and 115.

The output signal from the detector 115, after passage through the low-pass filter 27 and amplification in the error signal amplifier 28, is applied to the motor 29, which drives the aerial system, as indicated symbolically by the broken line.

Whether waves received from a transmitter or those received from an active or passive source (this latter case applies in particular to continuous wave radar) are considered, the frequency of the received wave has the form $F=F_o+F_d$, where $F_o$, the transmission frequency, is known and fixed and $F_d$ is the Doppler frequency which varies as a function of the target velocity. Prior to the precise location of the target, it is necessary to effect initial detection thereof by varying the frequency of the oscillator 13, so as to make it substantially equal $F_o+F_I+F_d$.

The sampling frequency $F_R$ should be several times higher than the signal bandwidth. The latter is in practice in the order of the bandwidth B of the selective filter inserted in the preamplifiers 141 and 142. Moreover, it is desirable that the sampling frequency should not be a sub-harmonic of the amplification frequency of the amplifier 17, since, otherwise, there is the risk that the sampling signal will penetrate through to the receiver output.

The bandwidth of the amplifier 17 should, on the other hand, be higher than twice the reciprocal of the sampling signal time.

A switch $K_1$ having two output positions R and P connects the output of the amplifier 17 either directly to the phase-amplitude detector 24 or to the input of the gate 191, and a switch $K_2$ breaks or makes the connection between the amplifier 17 and the gate 192.

A switch L, also of two-pole kind, having a search position $R_1$ and a tracking position $P_1$, is arranged at the control input of the oscillator 13 and makes it possible to apply to this, either the error signal 113, or a search signal supplied by a control device 210.

Finally, a switch M arranged at the input of the motor 29, ensures that the latter is earthed during the search phase.

All these switches and circuit-breakers are, of course, synchronously operated, either manually or automatically by the presence circuit $I_p$.

Figures 3, 4, 5:
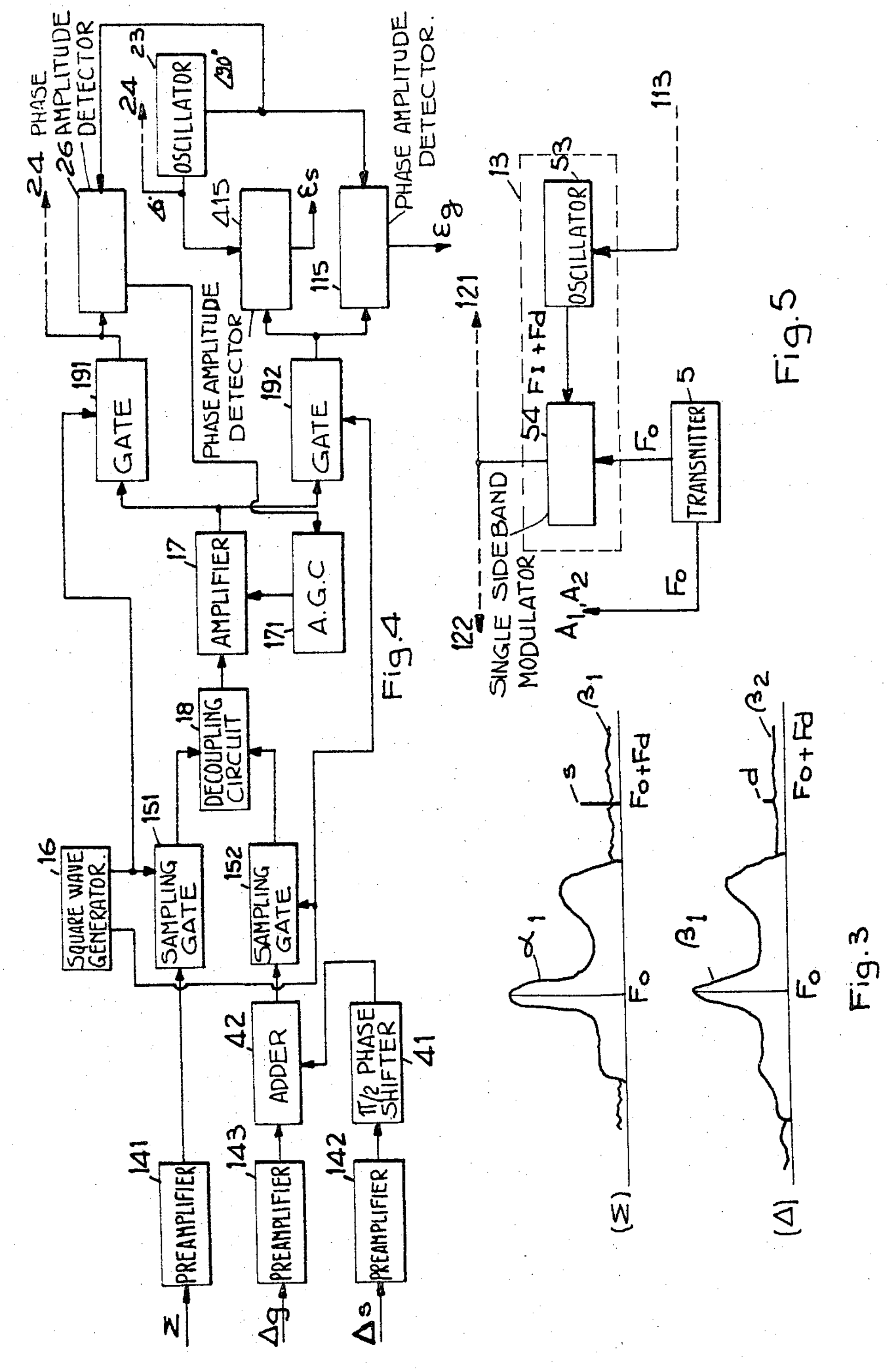
FIG. 3 illustrates the ultra high frequency signals applied to the input of the sum and difference channels of FIGS. 1 and 2.
FIG. 4 illustrates a preferred embodiment of the circuits of FIGS. 1 and 2, in the case where there are two difference signals.
FIG. 5 illustrates a detail of a receiver according to the invention, which may be used in particular for continuous wave radar systems.

In FIG. 3, the diagrams (Σ) and (Δ) respectively illustrate examples of the spectrum of the signals picked up through the sum and differmence channels, the frequency being plotted along the abscissae and the amplitude along the ordinates; $F_o$ is the transmission frequency ($\alpha_1$) and ($\beta_1$) represent the clutter signals, the curves ($\alpha_2$) and ($\beta_2$) indicate the thermal noise of the receiver, and the lines s and d indicate the target echo signals.

The invention has been described thus far in relation to the example of a sum signal and a single difference signal, in elevation or azimuth.

In the case where there are both an elevational difference signal and an azimuthal difference signal, it is possible to proceed in a similar way, using a three-phase sampling signal generator.

However, an economical solution consists in multiplexing the difference channels by operating them in phase quadrature; this can be initiated at the intermediate frequency or ultra high frequency stages.

In FIG. 4, the block diagram of the multiplexing circuit of a receiver of this kind has been illustrated for the case where phase-multiplexing is effected at the intermediate frequency stage.

In order not to make the figure too complicated, the aerial, the circuits responsible for producing the intermediate frequency input signals in the sum channel Σ, elevational difference channel $\Delta_s$ and azimuthal difference channel $\Delta_g$, and the frequency control arrangements, have not been shown since they do not form a part of the present invention.

The intermediate frequency signals, of the three channels Σ, $\Delta_g$, $\Delta_s$, are first amplified in the matched selective preamplifiers 141, 142 and 143, respectively.

The signal $\Delta_s$, for example, is accordingly shifted in phase by $\eta/2$ at 41, then combined with the signal $\Delta_g$ in the adder 42, which feeds the sampling gate 152, whilst the amplifier 141 is connected as indicated above to the gate 151. The gates 151 and 152 are, as in FIGS. 1 and 2, alternately opened by phase opposed signals from the two-phase generator 16.

The outputs of the gates are again connected to the amplifier 17 via the decoupling circuit 18, and the output of the amplifier feeds in parallel the two sampling gates 191 and 192.

Assuming that a reference signal, provided by a stable local oscillator 23 as in FIG. 2, is used, the azimuthal error signal $\epsilon_g$ is furnished by the phase-amplitude detector 115 connected on the one hand to the output of the gate 192 and on the other to the $\angle 90°$ output of the oscillator, and the elevational error signal $\epsilon_s$ is supplied by the phase-amplitude detector 415 connected on the one hand to the output of the gate 192 and on the other to the ∠0° output of the oscillator 23.

These signals, filtered and amplified, are employed in a conventional manner to indicate the direction of the target and/or to control the orientation of the aerial.

The circuit diagrams of the FIGS. 1, 2 and 4, relate in particular to the case of a tracking receiver where the transmitter or retransmitter is carried by the tracked target. In the case of a radar system receiver in which there is already a local oscillator operating at the frequency $F_o$, it will be advantageous, in accordance with the partial diagram of FIG. 5, to replace the local oscillator 13 hitherto supply the signal of frequency $F+F_I$, i.e. $(F_o+F_d)+F_I$, by the intermediate frequency oscillator arrangement 53 which is controlled to produce a signal of frequency $F_I+F_d$, which arrangement includes a single sideband modulator 54 connected to the transmitter 5; the other elements of the radar receiver are not otherwise different, and are therefore not illustrated.

So far, the invention has been described on the basis of the assumption that the signals received are of the continuous wave kind. It is equally applicable, however, in the case where these signals are in the form of train of pulse of sufficient length to enable sampling to be carried out. This in particular is the case in electromagnetic detection system (radar) of the interrupted continuous wave type. In this case, the sampling signal generator has to be synchronised by the chopping signals.

Figure 6:
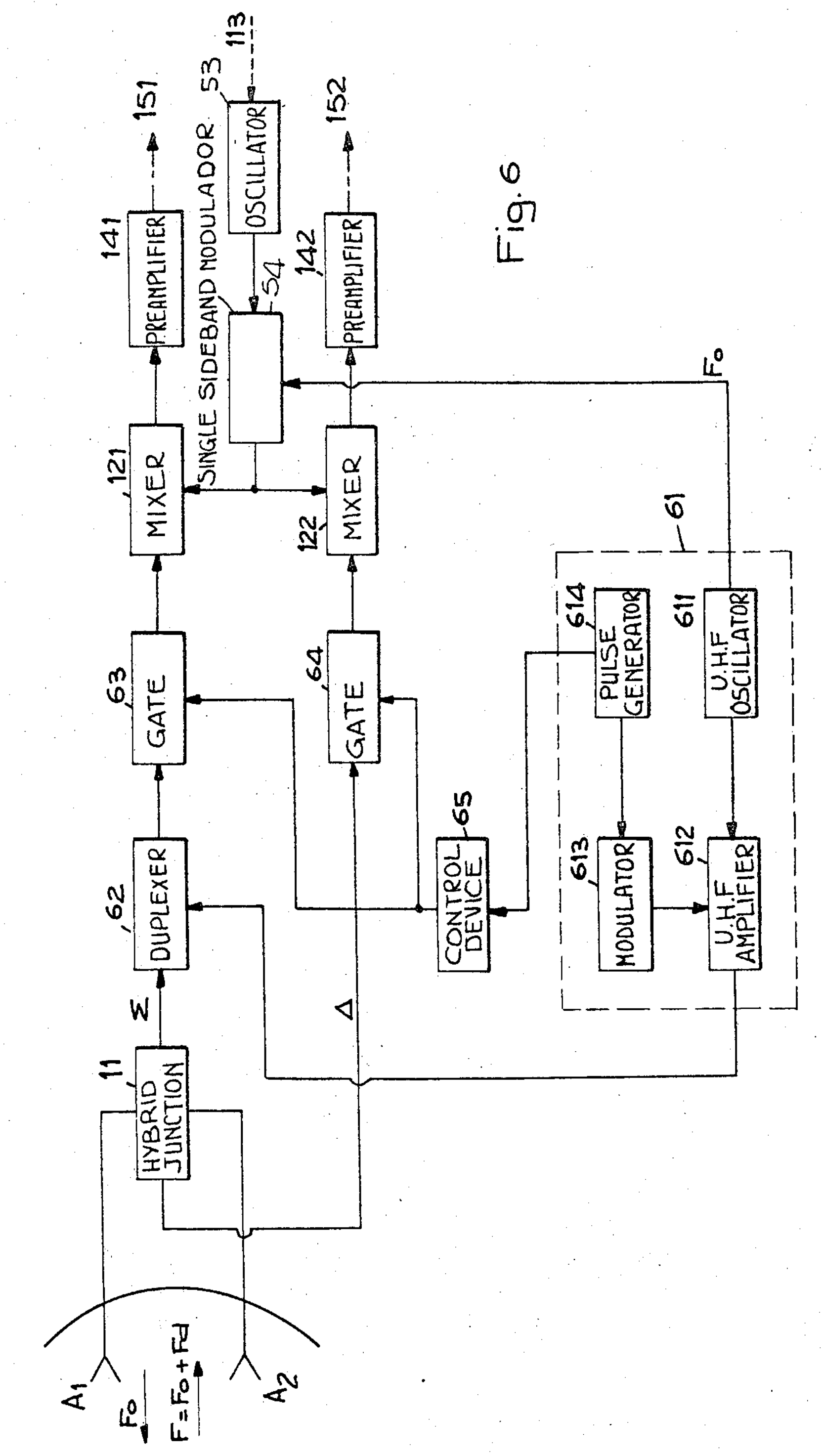
FIG. 6 is an example of a pulse Doppler radar receiver, according to the invention.

FIG. 6 illustrates an example of a radar system of this kind, comprising a receiver according to the invention, for the case in which there is a single difference signal.

In this figure, the only part of the receiver which is shown is that preceding the sampling gates 151 and 152. The circuit following these gates is not different from the corresponding continuous wave circuit.

The transmitter circuit is illustrated at 61 in its essentials. It comprises a local ultra high frequency oscillator 611 feeding an ultra high frequency amplifier 612 controlled by a modulator 613 which latter is synchronized by a pulse generator 614.

The oscillator 611 is also coupled to the single sideband modulator as in the case of the continuous wave radar illustrated in FIG. 5.

The amplifier 612 is coupled to the duplexer 62, which in turn is coupled to the sum channel of the hybrid ring arrangement 11 and to the signal input of a gate 63, whilst the difference channel of the circuit 11 is coupled to the signal input of a gate 64.

The gates 63 and 64 are opened synchronously by pulses supplied to their control inputs and produced by a control device 65 which is synchronized with the generator 614. For example, for a radar equipment with a 05 duty cycle, the devices 65 and 613 will be antiphase-operated squarewave generators and the generator 614 a sinusoidal generator, so that the gates are opened when the modulator 613 is inoperative, and vice versa.

For a smaller pulse duty cycle, the device 65 may for example include controlled delay arrangements and a monostable multivibrator whose relaxation time is equivalent to the transmitted pulse.

The output signals from the gates 63 and 64 are subsequently multiplexed and then handled in the manner used in continuous wave radar.

Of course, the invention is not limited to the embodiments described and illustrated, which are given by way of non-limitative examples. In particular, the frequency control circuits, and the way in which the directional error signal is finally produced, may be combined or modified in accordance with known techniques, the essential thing being that the signal of the sum and difference channels are sampled and then passed through a single variable gain amplifier.

What is claimed is:

1. A multiple beam electromagnetic receiver including means for simultaneously receiving a plurality of signals and means for deriving therefrom an intermediate frequency sum signal and at least one intermediate frequency difference signal, comprising: means for alternately sampling said sum and difference signals, a variable gain amplifying circuit having a signal input, a control input and an output, means for feeding all said sampled signals to said input; switching means having an input coupled to said amplifier output and a plurality of outputs respectively corresponding to said sum and difference signals, means for controlling said switching means in synchronism with said sampling means, and means for coupling said output corresponding to said sum signal to said control input.

2. A receiver as claimed in claim 1, further comprising a plurality of filtering means, respectively coupled to said switching means outputs and having a plurality of outputs, respectively corresponding to said sum and difference signals, and comparing means having a first input coupled to said filtering means output corresponding to said sum signal and a second input coupled to another one of said filtering means outputs.

3. A receiver as claimed in claim 2, further comprising frequency discriminating means having an input coupled to said filtering means output corresponding to said sum signal and an output coupled to said means for deriving said intermediate frequency signals.

4. A multiple beam electromagnetic receiver including means for simultaneously receiving a plurality of signals and deriving therefrom a first and a second dfference signals and a sum signal, comprising: means for deriving from said first and second difference signals an auxiliary signal which is the sum of said first difference signal, phase shifted by $\pi/2$ and of said second difference signal; means for alternately sampling said sum and auxiliary signals; a variable gain amplifying circuit having a signal input, a control input and an output, means for feeding all said sampled signals to said signal input; switching means having an input coupled to said amplifier output, and a first and a second output respectively corresponding to said sum and auxiliary signals; stable oscillating means having a first and a second oscillator output respectively phase shifted by $\pi/2$ with respect to each other; first, second and third phase amplitude detectors, said first detector having a first input, coupled to said switching means first output and a second input, coupled to said first oscillator output, and an output, coupled to said control input, said second and third detectors having respective first inputs coupled to said switching means second output and respective second inputs coupled respectively to said first and second outputs of said oscillator.

References Cited

UNITED STATES PATENTS

| | | | |
|---|---|---|---|
| 3,175,215 | 3/1965 | Blasberg et al. | 343—16 |
| 3,229,287 | 1/1966 | Hovda | 343—16 |
| 3,340,532 | 9/1967 | Glomb et al. | 343—113 |

RODNEY D. BENNETT, *Primary Examiner.*

R. E. BERGER, *Assistant Examiner.*